(12) United States Patent
Fujisaku

(10) Patent No.: US 6,882,944 B2
(45) Date of Patent: Apr. 19, 2005

(54) THRESHOLD SETTING APPARATUS FOR ADJUSTABLY SETTING A THRESHOLD FOR USE IN IDENTIFYING SERIAL DATA FROM A BASEBAND SIGNAL

(75) Inventor: Yoshiharu Fujisaku, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 20 days.

(21) Appl. No.: 10/325,885

(22) Filed: Dec. 23, 2002

(65) Prior Publication Data

US 2003/0229461 A1 Dec. 11, 2003

(30) Foreign Application Priority Data

Jun. 10, 2002 (JP) .................................. 2002-168156

(51) Int. Cl.[7] .......................... G01R 13/00; G06F 19/00
(52) U.S. Cl. ...................................................... 702/66
(58) Field of Search ............................. 702/66, 69–73, 702/106, 107, 124, 190, 193; 324/76.11, 76.12, 600, 620

(56) References Cited

U.S. PATENT DOCUMENTS

2001/0040922 A1 * 11/2001 Buchali et al. ............. 375/233

FOREIGN PATENT DOCUMENTS

| EP | 1 139 622 | * 10/2001 |
|---|---|---|
| JP | 58-114637 | 7/1983 |
| JP | 01-286655 | 11/1989 |
| JP | 06-310967 | 11/1994 |
| JP | 07-154342 | 6/1995 |
| JP | 08-018429 | 1/1996 |
| JP | 8-265273 | 10/1996 |
| JP | 09-270755 | 10/1997 |
| JP | 11-136196 | 5/1999 |

* cited by examiner

*Primary Examiner*—Michael Nghiem
(74) *Attorney, Agent, or Firm*—Wenderoth, Lind & Ponack, L.L.P.

(57) ABSTRACT

Threshold setting apparatus controls a relative relation in DC level between a baseband signal produced by processing a received signal and a threshold for use in identifying serial data from the baseband signal. The apparatus includes a waveform distortion estimating circuit and a setting circuit. The waveform distortion estimating circuit estimates, based on the baseband signal, a relation between the center of the dynamic range of the baseband signal and a crossing point where a positive-going edge curve crosses a negative-going edge curve of an eye pattern formed by the baseband signal. The setting circuit adjustably sets either the threshold or the DC level of the baseband signal in dependence upon the relation estimated by the waveform distortion estimating circuit.

16 Claims, 5 Drawing Sheets

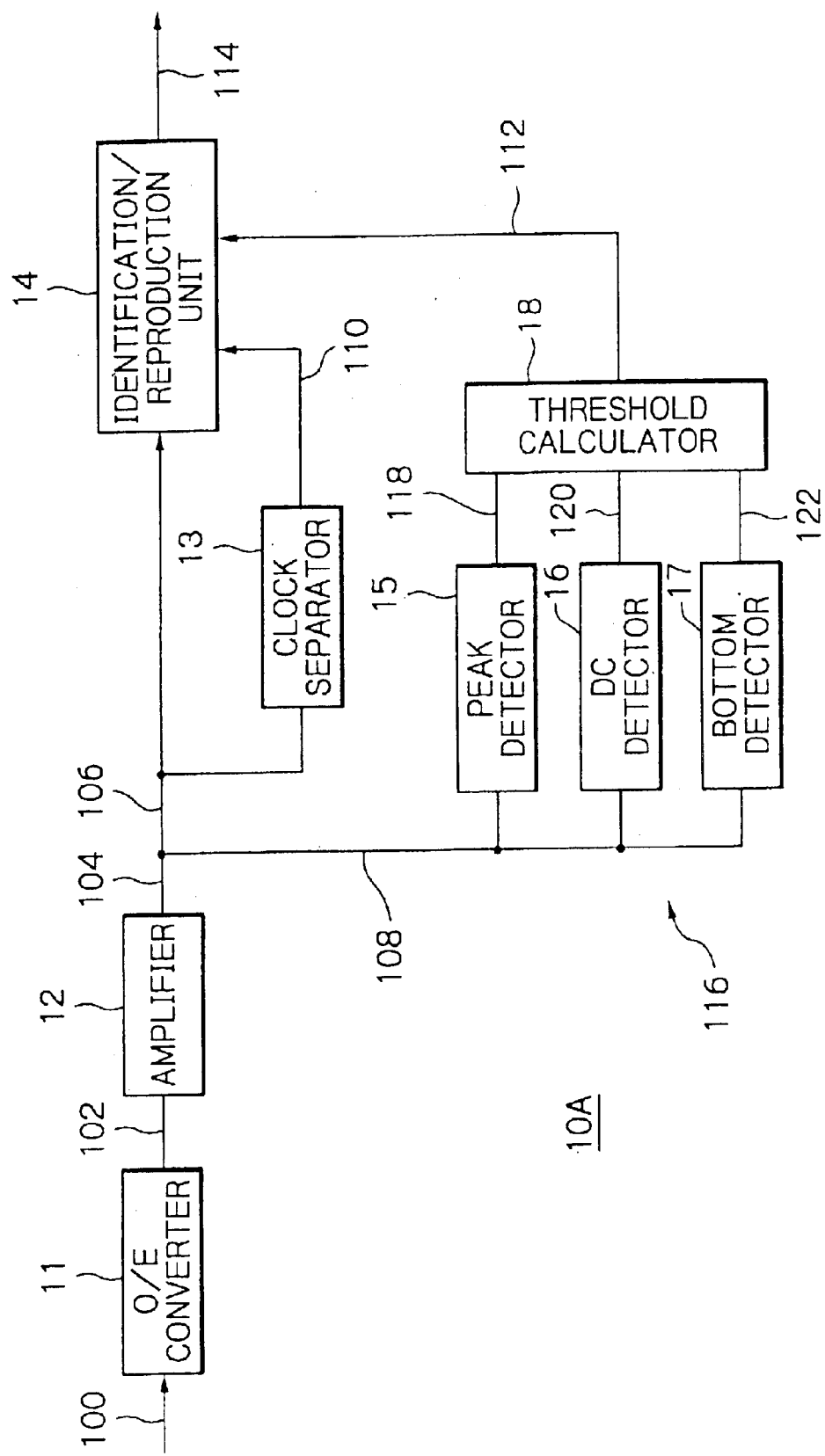

THRESHOLD SETTING APPARATUS FOR ADJUSTABLY SETTING A THRESHOLD FOR USE IN IDENTIFYING SERIAL DATA FROM A BASEBAND SIGNAL

BACKGROUND OF THE INVENTION

1. Field of the Invention

The present invention relates to apparatus for setting an identification threshold for use in identifying and reproducing serial data from a baseband signal received or automatically setting the DC level of a received baseband signal, and advantageously applicable to an optical signal receiver configured to receive, e.g. an intensity-modulated optical signal.

2. Description of the Background Art

An optical signal receiver of the type is conventional which receives from a transmitter, e.g. an optical pulse signal modulated in intensity with the logical level of data to be sent. In this type of optical receiver, the received optical signal is converted to an electric signal corresponding thereto, and then compared in level with an identification threshold in order to determine the logical level of data received.

It is a common practice with the optical signal receiver of the type referred to above to set the identification threshold at the center of a dynamic range between the peak and bottom levels of the received electric signal. This scheme is extensively used because of its simplicity and versatility. However, when the transmitter uses, e.g. an EA (Electro-Absorption) modulator, the crossing point of the received signal where the curves of a positive-going and a negative-going edge cross each other when occurring at the same timing is apt to fail to coincide with the center of the dynamic range. In such a case, the optimum threshold produced in the receiver is also shifted from the center. Further, it is likely that the optimum threshold is shifted from the center due to the dispersion of wavelength or polarization mode.

In light of the above, systems for automatically adjusting the threshold in accordance with the received signal have been proposed in the past. Japanese patent laid-open publication No. 265273/1996, for example, discloses a system including a number-of-errors detecting circuit configured to determine the degree of errors having occurred in serial data identified and reproduced. The degree of errors determined is reflected back to a new identification threshold. This kind of threshold setting system, however, needs a high-speed, sophisticated logic integrated circuit for detecting errors in serial data. It was therefore difficult to implement simple, low-cost apparatus for setting an identification threshold.

SUMMARY OF THE INVENTION

It is an object of the present invention to provide threshold setting apparatus capable of automatically, relatively setting an identification threshold with low-speed, simple circuit arrangement.

Threshold setting apparatus in accordance with the present invention controls a relative relation in DC level between a baseband signal produced by processing a received signal and a threshold for use in identifying data from the baseband signal. The threshold setting apparatus includes a waveform distortion estimating circuit and a setting circuit. The waveform distortion estimating circuit estimates, based on the baseband signal, a relation between the center of the dynamic range of the baseband signal and a crossing point where a positive-going edge curve crosses a negative-going edge curve of an eye pattern formed by the baseband signal to produce estimated information. The setting circuit varies either one of the threshold and the DC level of the baseband signal in dependance upon the information estimated by the waveform distortion estimating circuit.

BRIEF DESCRIPTION OF THE DRAWINGS

The objects and features of the present invention will become more apparent from consideration of the following detailed description taken in conjunction with the accompanying drawings in which:

FIG. 1 is a schematic block diagram showing an optical signal receiver embodying the present invention;

DESCRIPTION OF THE PREFERRED EMBODIMENTS

Figure 2A:
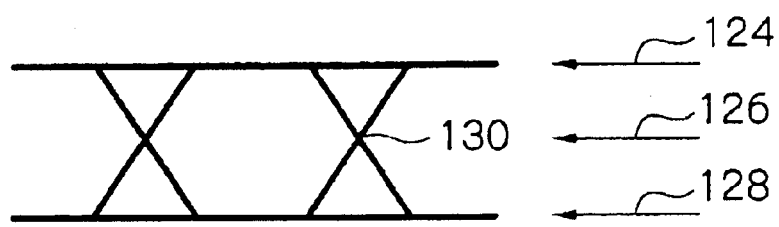
FIGS. 2A, 2B and 2C are charts for useful for understanding a relation between a signal waveform and a threshold with the illustrative embodiment shown in FIG. 1.

Referring to FIG. 1 of the drawings, an optical signal receiver, generally 10A, to which applied is threshold setting apparatus embodying the present invention is made up of an O/E (Optical-to-Electrical) converter or transducer 11, an amplifier 12, a clock separator 13, an identification and reproduction unit 14, a peak detector 15, a DC level detector 16, a bottom detector 17, and a threshold calculator 18 interconnected as illustrated. The peak detector 15, DC detector 16, bottom detector 17 and threshold calculator 18 constitute in combination a threshold setting circuit 116 for setting an identification threshold.

The O/E converter 11 is adapted to convert an incoming optical signal 100 to a corresponding baseband electric signal 102. In the following, signals are designated with reference numerals directed to connections on which the signals appear. With the illustrative embodiment, the optical signal 100 is subjected to, e.g. intensity modulation by a remote transmitter, not shown, which is adapted to modulate an optical beam in intensity with serial data to be sent, which may be a pulse signal, and transmit an optical signal thus modulated whose intensity goes high or low. The serial data is implemented as, e.g. an NRZ (Non-Return-to-Zero) signal or a modified NRZ signal with the embodiment. A wavelength filter, not shown, may be located at a stage preceding, or at the input stage of, the O/E converter 11, if desired.

The amplifier 12 amplifies the electric signal or received baseband signal 102 output from the O/E converter 11, and may include, e.g. an AGC (Automatic Gain Control) function. The amplified electric signal 104 output from the amplifier 12 is branched away into two signals, i.e. a signal for receipt processing 106 and a signal for threshold control 108. The amplifier 12 may be omitted if the output level 102 of the O/E converter 11 is sufficiently high.

The clock separator 13 is adapted to separate from the signal for receipt processing 106 output from the amplifier 12 a timing clock particular to the serial data sent from the transmitting station. The separated timing clock 110 is fed from the clock separator 13 to the identification and reproduction unit 14.

The identification and reproduction unit 14 is adapted for comparing the level of the signal for receipt processing 106 with a threshold or threshold signal 112, which will be described later, at a timing determined by the timing clock 110 separated by the clock separator 13. The identification and reproduction unit 14 determines, based on the result of the comparison, a code carried by, or the logical level of, the signal for receipt processing 106 to reproduce or restore serial data transmitted from the transmitter on its output port 114.

The threshold setting circuit 116, made up of the peak detector 15, DC detector 16, bottom detector 17 and threshold calculator 18, is adapted to automatically set the identification threshold to provide the identification and reproduction unit 14 with the threshold signal 112. Specifically, the peak detector 15 detects and holds the peak level, i.e. logical ONE, of the signal for threshold control 108 output from the amplifier 12 and feeds the peak level signal 118 to the threshold calculator 18. For the peak detector 15, use may be made of a conventional peak hold circuit.

The DC level detector 16 detects and holds the DC level of the signal for threshold control 108 output from the amplifier 12 and delivers the DC level signal 120 to the threshold calculator 18. The DC detector 16 may be implemented as an LC filter or similar low-pass filter (LPF) by way of example. When use is made of a low-pass filter, the DC detector 16 can detect a DC level if the low-pass filter is provided with a cutoff frequency sufficiently lower than the minimum frequency of the signal for receipt processing 108.

The bottom detector 17 detects and holds the bottom level or logical ZERO of the signal for threshold control 108 output from the amplifier 12 and delivers the bottom level signal 122 to the threshold calculator 18. The bottom detector 17 may be implemented as a conventional bottom level hold circuit.

In an application in which the peak and bottom level hold circuits implementing the peak detector 15 and bottom detector 17, respectively, are of the type needing a signal indicative of a detection timing, the timing clock 110 output from the clock separator 13 may be supplied to the peak and bottom level hold circuits.

The threshold calculator 18 establishes the threshold to feed the identification and reproduction unit 14 with the threshold signal 112, in response to the peak level, DC level and bottom level signals 118, 120 and 122 received from the peak detector 15, DC detector 16 and bottom detector 17, respectively. How the threshold calculator 18 produces the threshold will be described in detail later in conjunction with the operation of the optical signal receiver 10A.

In operation, an optical signal 100 input to the optical signal receiver 10A is converted to an electric baseband signal 102 by the O/E converter 11 and then amplified by the amplifier 12 to a desired amplitude. The amplified electric signal 104 is input to the clock separator 13 and identification and reproduction unit 14 as a signal for receipt processing 106 on one hand and to the peak detector 15, DC detector 16 and bottom detector 17 as a signal for threshold control 108 on the other hand.

The clock separator 13 separates a timing clock 110 from the signal for receipt processing 106 and feeds the timing clock 110 to the identification and reproduction unit 14. The identification and reproduction unit 14 identifies and reproduces a code carried by, or the logical level of, the received signal for receipt processing 106 in synchronism with the separated timing clock 110 to output the restored signal 114 having the code or logical level thus determined. For this identification and reproduction, a threshold for decision 112 is fed from the threshold calculator 18 to the identification and reproduction unit 14, as stated earlier.

How the threshold setting circuit 116 sets a threshold for decision 112 will be described more specifically hereinafter. The peak detector 15 detects and holds the peak level or absolute maximum level of the signal for threshold control 108. The DC level detector 16 detects and holds the absolute DC level of the signal for threshold control 108. The bottom detector 17 detects and holds the bottom level or absolute minimum level of the signal for threshold control 108. The resulting information on peak level 118, DC level 120 and bottom level 122 is input to the threshold calculator 18. The threshold calculator 18 in turn determines an optimum threshold in response to the information 118, 120 and 122 and feeds the identification and reproduction unit 14 with the optimum threshold as a threshold signal 112.

To better understand the operation of the threshold setting circuit 116, reference will be made to FIGS. 2A, 2B and 2C, each of which shows a particular condition in which a peak level 124, a DC level 126 and a bottom level 128 are detected. FIG. 2A shows an eye pattern appearing when the incoming optical signal 100 is an ideal NRZ signal. In this case, the DC level 126 is positioned just at the center of the dynamic range between the peak level 124 and the bottom level 128. In an application where an optical amplifier is absent at a stage preceding the O/E converter 11, the optimum threshold is on the center of the dynamic range between the peak level 124 and the bottom level 128, i.e. corresponds to the DC level 126.

Figure 2B:
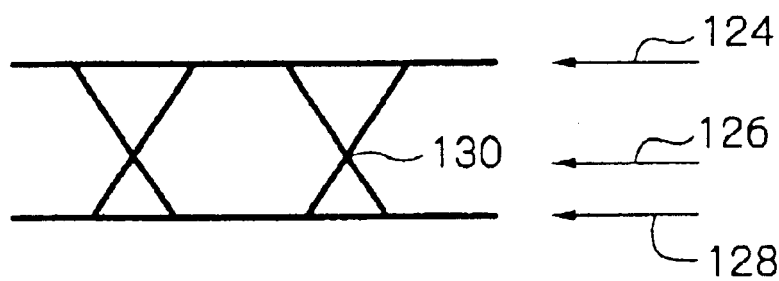

FIG. 2B shows an eye pattern appearing when the crossing point 130 is shifted downward. This kind of eye pattern, i.e. waveforms, is apt to appear when the transmitter uses, e.g. an EA modulator. That is also the case with the dispersion of wavelength or polarization mode, or the nonlinearity involved in the receiver system. As shown, the DC level 126 is positioned below the center of the dynamic range between the peak level 124 and the bottom level 128, and so is the optimum threshold.

Figure 2C:
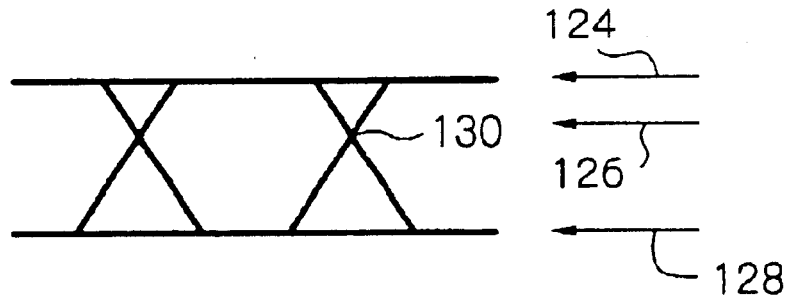

FIG. 2C shows another eye pattern, which appears when a crossing point 130 is shifted upward. This kind of eye pattern is also apt to appear due to the dispersion of wavelength or polarization mode, or the nonlinearity of the receiver system. As shown, the DC level 126 is positioned above the center of the dynamic range between the peak level 124 and the bottom level 128, and so is the optimum threshold.

As stated above, although the optimum threshold depends on the received waveform, it can be determined by using the peak, DC and bottom levels. The threshold calculator 18 determines an optimum threshold, relying upon those three parameters, and delivers the optimum threshold thus determined to the identification and reproduction unit 14 as a threshold signal 112.

More specifically, the threshold calculator 18 produces an optimum threshold by using a ternary equation including the three parameters mentioned above as variables. For example, assuming that the peak, DC and bottom levels are represented by x, y and z, respectively, an optimum threshold $TH_{op}$ is expressed as:

$$TH_{op} = a(y - (x+z)/2) + (x+z)/2, \qquad (1)$$

where the term $(x+z)/2$ corresponds to the center of the dynamic range, and the letter a denotes an adjustment coefficient that is around unity.

The Equation (1) therefore indicates that the threshold calculator 18 produces an adjustment amount that reflects a difference between the center of the dynamic range and the DC level by a ratio represented by the adjustment coefficient a, and then selects a level shifted from the center of the dynamic range by the adjustment amount.

As far as the Equation (1) is concerned, the adjustment coefficient a is dealt with as a constant. However, the optimum value of the adjustment coefficient a may vary, depending on the system configuration of the optical signal transmitter, transmission path and optical signal receiver 10A. In light of this, the threshold calculator 18 should preferably be adapted for varying the adjustment coefficient a. As the Equation (1) indicates, if the adjustment coefficient a is unity by way of example, then the optimum threshold $TH_{op}$ is y, i.e. the threshold coincides with the DC level. Stated another way, when it is desired to make the threshold coincide with the DC level, the adjustment coefficient a of unity suffices.

Some different configurations are available for the threshold calculator 18 to solve the Equation (1). In one specific configuration, use is made of an analog circuit including, e.g. an operational amplifier. In another specific configuration, each of the input stages of the threshold calculator 18 connected to the peak detector 15, DC detector 16 and bottom detector 17, respectively, may include an analog-to-digital (AD) converter, not shown. With such a configuration, the threshold calculator 18 is adapted to solve the Equation (1) by a digital circuit or software processing. In a further specific configuration, each of the input stages of the threshold calculator 18 is adapted to include an AD converter while the peak detector 15, DC detector 16, bottom detector 17 and threshold calculator 18 themselves are all implemented as digital circuits or by software.

As stated above, the illustrative embodiment can estimate the distortion of the waveform of a received signal 102 on the basis of a peak, a DC and a bottom level detected to automatically, relatively set an adequate threshold for identification and reproduction. In addition, the peak, DC and bottom levels can be detected by low-speed or analog circuitry, so that the threshold setting circuit 116 is simple in structure and low in cost. Feedback control used to set a threshold would make the threshold setting circuit sophisticated in structure and high in cost although it might be desirable in the aspect of threshold optimization.

Figure 3:
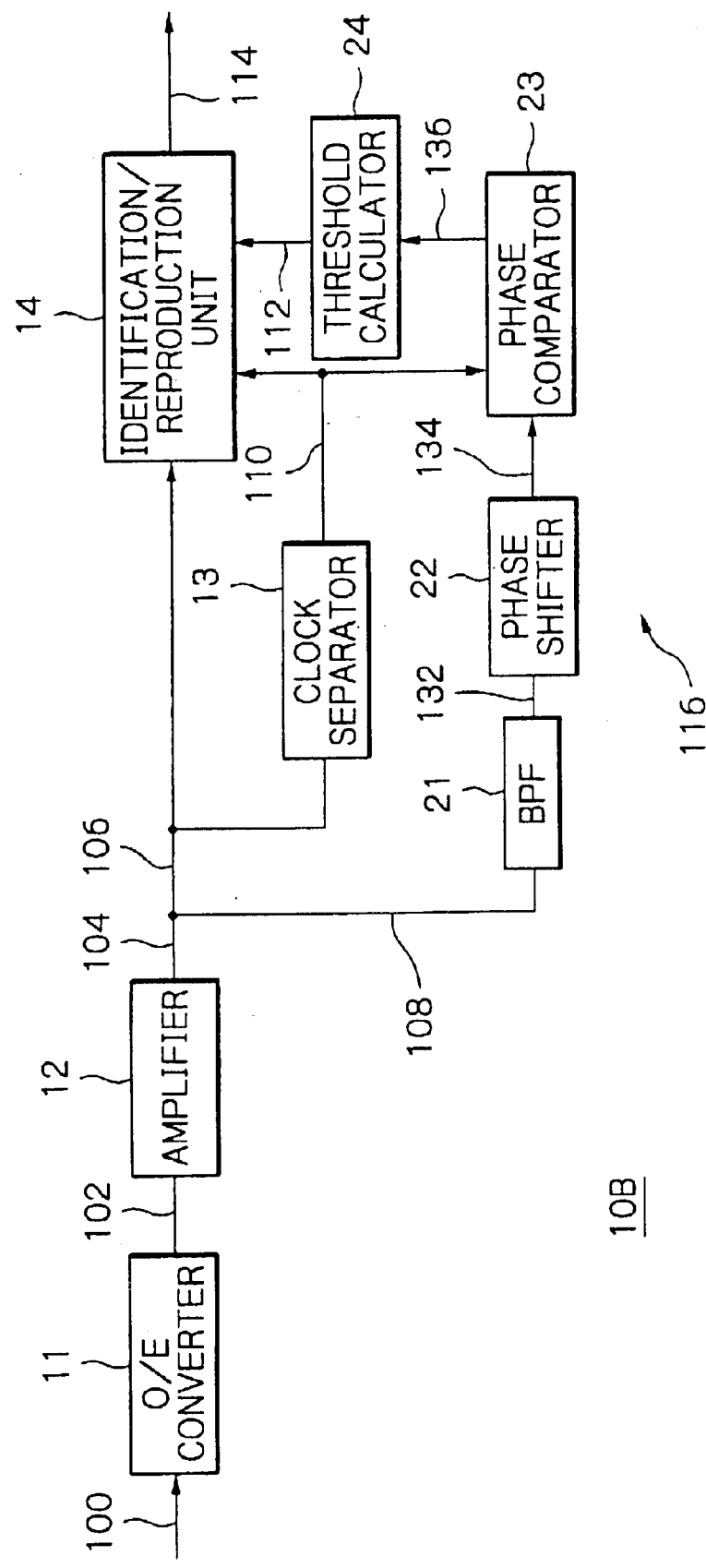
FIG. 3 is a schematic block diagram, like FIG. 1, showing an alternative embodiment of the present invention.

Reference will now be made to FIG. 3 for describing an alternative embodiment of the present invention, which is also applied to an optical signal receiver. In FIG. 3, blocks like those shown in FIG. 1 are designated by identical reference numerals and will not be described specifically in order to avoid redundancy. As shown, the optical signal receiver, generally 10B, includes a band-pass filter (BPF) 21, a phase shifter 22, a phase comparator 23 and a threshold calculator 24 as well as the O/E converter 11, amplifier 12, clock separator 13, and identification and reproduction unit 14 as connected as illustrated.

The band-pass filter 21 is adapted to separate from the signal for threshold control 108 output from the amplifier 12 a high-frequency signal component 132 whose frequency is coincident with the bit rate of the received signal 104. The high-frequency signal component 132 thus separated is input to the phase shifter 22. For example, if the bit rate of the signal 104 output from the amplifier 12 has a bit rate of 10 Gbit/s, then the band-pass filter 21 is designed to separate a high-frequency signal component of 10 GHz. In the following description, let the bit rate be assumed to be 10 Gbit/s by way of example. The band-pass filter 21 may be configured to separate high-frequency components of both in-phase and opposite-phase and superpose both of them on each other.

The phase shifter 22 is adapted to shift the phase of the high-frequency signal 132 output from the band-pass filter 21 by a preselected amount. For this purpose, the phase shifter 22 may delay the high-frequency signal 132 by a preselected period of time. The amount of phase shift or delay time will be described later in detail.

The phase comparator 23 is adapted to determine the amplitude of the high-frequency signal 134 and a phase difference of the high-frequency signal 134 from the timing clock 110 input thereto. The phase comparator 23 feeds signals 136 representative of the phase difference and amplitude thus determined to the threshold calculator 24. The threshold calculator 24 is adapted for determining an optimum threshold on the basis of the signals 136 input from the phase comparator 23 and feeds the optimum threshold to the identification and reproduction unit 14 as a threshold signal 112.

The amount of phase shift or delay time is selected in such a fashion that, assuming that the electric signal 104 output from the amplifier 12 has an ideal waveform, the high-frequency signal 134 output from the phase shifter 22 differs in phase from the timing clock 110 output from the clock separator 13 by a preselected amount, which may be e.g. zero.

The phase shifter 22 is used to match the phases of the two signals 134 and 110 input to the phase comparator 23. Such phase matching function may alternatively be implemented by disposing a phase shifter in the connection 110 between the clock separator 13 and the phase comparator 23, if desired. The phase shifter 22 may even be omitted if the length of the connections assigned to the timing clock 110 output from the clock separator 13 and to the high-frequency signal 134 output from the band-pass filter 21 are adequately selected.

The operation of the optical signal receiver 10B will be described hereinafter. It is to be noted that the O/E converter 11, amplifier 12, clock separator 13 and identification and reproduction unit 14 operate to reproduce a received signal in exactly the same manner as described with reference to FIG. 1. One of the two signals branched away after the amplification of the amplifier 12 is input to the band-pass filter 21 as a signal for threshold control 108.

The band-pass filter 21 separates a high-frequency signal 132 whose frequency is coincident with the bit rate of the input signal 102. The high-frequency signal 132 output from the band-pass filter 21 is shifted in phase by the phase shifter 22 by the preselected amount and then input to the phase comparator 23. The timing clock 110 output from the clock separator 13 is also input to the phase comparator 23. The phase comparator 23 determines a phase difference between the high-frequency signal 134 and the timing clock 110 and the amplitude of the high-frequency signal 134, and delivers them to the threshold calculator 24.

The threshold calculator 24 determines an optimum threshold on the basis of the phase difference and amplitude input thereto, and feeds the resulting threshold signal 136 to the identification and reproduction unit 14. To better understand the illustrative embodiment, FIGS. 4A, 4B and 4C each show a particular relation between the waveforms or eye pattern of the signal for threshold control 108 and the separated high-frequency signal 134.

Figure 4A:
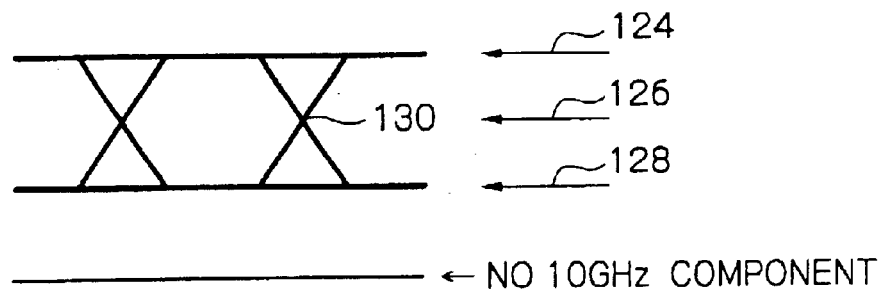
FIGS. 4A, 4B and 4C are charts useful for understanding a relation between a signal waveform and a threshold with the alternative embodiment.

Specifically, FIG. 4A shows the eye pattern of an ideal signal for threshold control 108 (NRZ signal). As shown, when the signal for threshold control 108 is ideal, the upper and lower portions of the eye pattern are symmetrical to each other, i.e. the crossing point 130 is coincident with the center of the dynamic range between the peak level 124 and the bottom level 128. In this condition, a 10 GHz high-frequency signal does not appear.

Figure 4B:
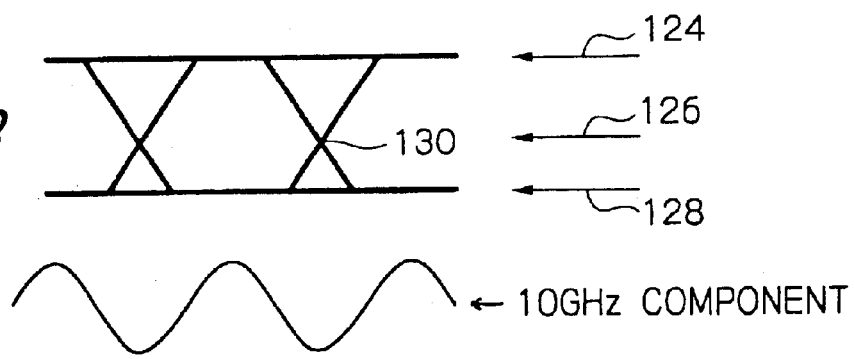

FIG. 4B shows a condition wherein the crossing point 130 is lower than the center of the dynamic range. In this case, a 10 GHz high-frequency signal appears in a phase shown in FIG. 4B. As the shift of the crossing point 130 from the center of the dynamic range increases, the amplitude of the high-frequency signal 134 increases, too.

Figure 4C:
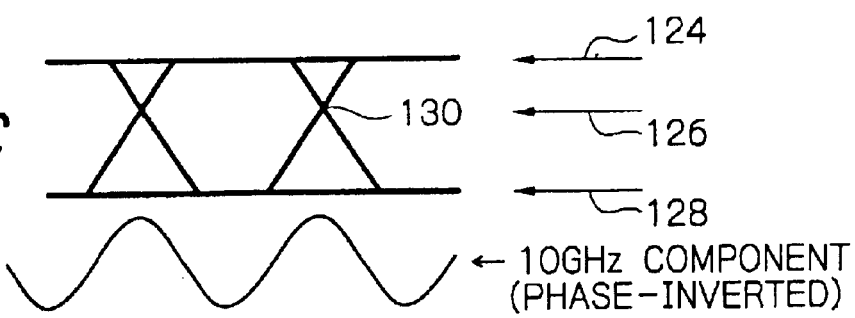

FIG. 4C shows another condition, where the crossing point 130 is higher than the center of the dynamic range. In this case, a 10 GHz high-frequency signal appears in a phase shown in FIG. 4C. As shown, the phase of the high-frequency signal 132 differs from the phase of the high-frequency signal shown in FIG. 4B by 180° (δ). Again, as the shift of the crossing point 130 from the center of the dynamic range increases, the amplitude of the high-frequency signal 134 increases, too.

As FIGS. 4A, 4B and 4C indicate, by detecting the phase and amplitude of the high-frequency signal 132, it is possible to quantitatively determine the direction in which the crossing point 130 is shifted as well as the amount of shift. It is to be noted that the cases shown in FIGS. 4B and 4C are distinguished from each other in consideration of their relation with the timing clock 110 output from the clock separator 13.

The threshold calculator 24 produces a threshold on the basis of the signal 136 representing the phase and amplitude of the high-frequency signal 134 detected. To produce a threshold, the threshold calculator 24 may be implemented as either one of an analog and a digital circuit. In the case of a digital circuit, there should be included a device for digitizing the phase and amplitude of the high-frequency signal 134. Alternatively, the threshold calculator 24 may be implemented by software so long as it includes a device for digitizing the phase and amplitude of the high-frequency signal 134.

As stated above, the illustrative embodiment can separate a high-frequency signal 134 whose frequency is coincident with the bit rate of the signal for threshold control 108 and estimate the distortion of a received signal 102 on the basis of the high-frequency signal 108 to automatically set an adequate threshold for identification and reproduction. Further, the circuitry for the detection of a high-frequency signal can be implemented as analog circuitry, making the threshold setting circuit 116 simple in structure and low in cost.

Figure 5:
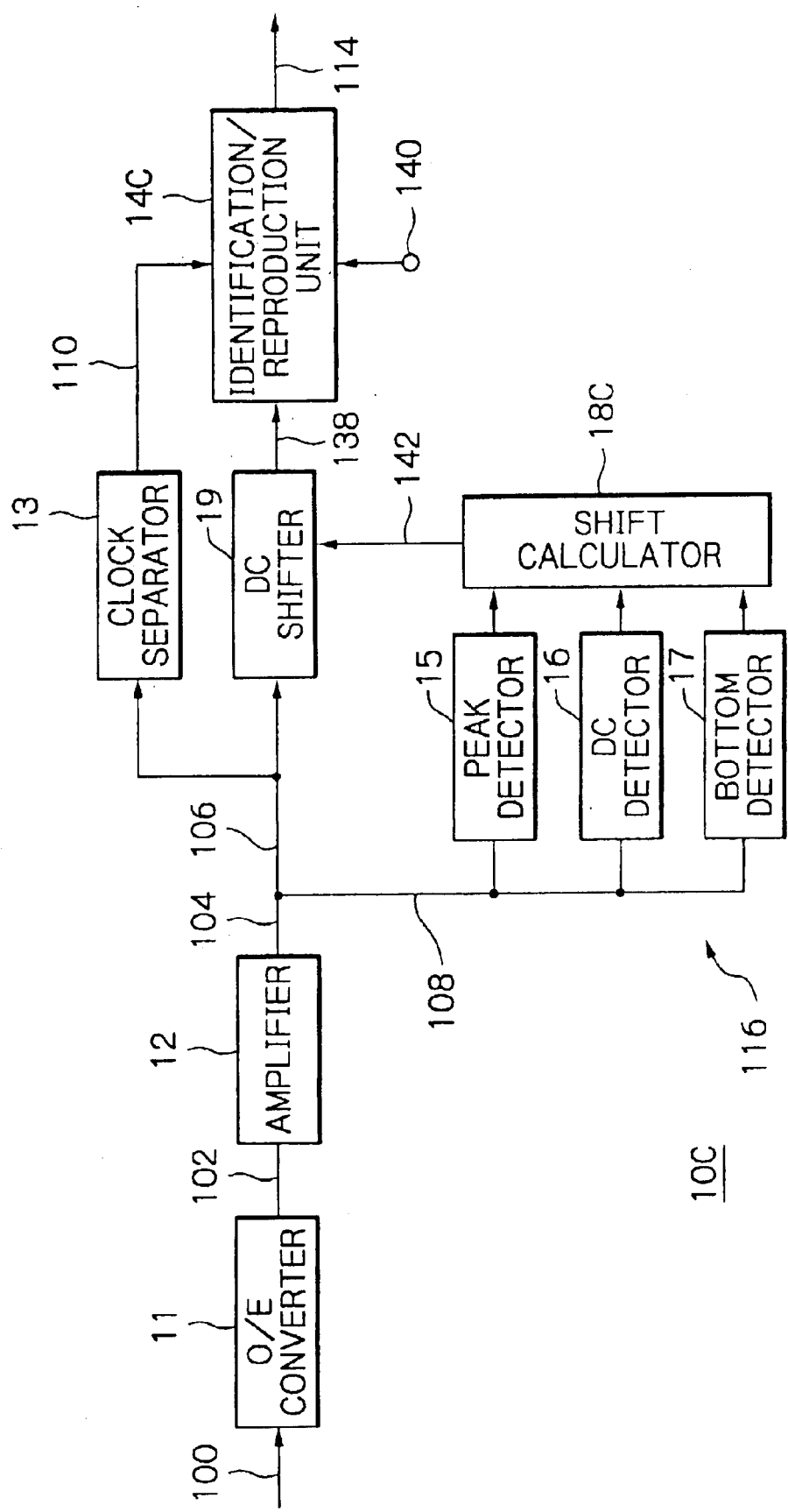
FIG. 5 is a schematic block diagram, like FIG. 1, showing another alternative embodiment of the present invention.

Reference will further be made to FIG. 5 for describing another alternative embodiment of the present invention, which is also applied to an optical signal receiver. To enhance the accuracy in reproduction of a received signal 114, the embodiment shown in FIG. 1 varies the level of the identification threshold 112 to be compared with the signal for receipt processing 106 by the identification and reproduction unit 14 for thereby compensating for the waveform distortion included in the received signal 102. By contrast, the embodiment shown in FIG. 5 achieves the same object by varying the DC level of the signal for receipt processing 106. In FIG. 5, blocks like those shown in FIG. 1 are designated by identical reference numerals and will not be described specifically in order to avoid redundancy.

As shown in FIG. 5, the optical signal receiver, generally 10C, includes a DC level shifter 19 interconnected between the amplifier 12 and the identification and reproduction unit 14C. The signal for receipt processing 104 output from the amplifier 12 is input to the clock separator 13 and DC level shifter 19. The clock separator 13 separates a timing clock from the signal for receipt processing 106 and feeds an identification and reproduction unit 14C with the timing clock 110 as in the embodiment of FIG. 1.

The DC level shifter 19 is adapted to shift the DC level of the signal for receipt processing 106 by a shift amount 142 indicated by a shift calculator 18C, which will be described later, and feeds the identification and reproduction unit 14C with a signal 138 representative of the resultant, shifted DC level. By so shifting the DC level, the DC shifter 19 shifts the entire waveform of the signal for receipt processing 106.

In the illustrative embodiment, the identification and reproduction unit 14C is adapted to compare the signal for receipt processing 106 output from the DC shifter 19 with a fixed threshold value 140 at a timing determined by the timing clock 110, which is output from the clock separator 13. The identification and reproduction unit 14C determines, or reproduces, the code or logical level of serial data 102 sent from a transmitter in accordance with the result of the above comparison.

The shift calculator 18C, which corresponds to the threshold calculator 18 shown in FIG. 1, is adapted to produce a shift amount 142, which is supplied to the DC level shifter 19. The shift amount 142 corresponds to a difference of the threshold 112 which the threshold calculator 18 of the FIG. 1 embodiment calculates in accordance with the Equation (1) from the fixed threshold 140 input to the identification and reproduction unit 14C with its sign (positive or negative) inverted. The shift calculator 18C then feeds the DC shifter 19 with the resultant shift amount 142.

It is to be noted that the identification and reproduction units 14 and 14C are identical with each other as to the relative result of comparison between the signal for receipt processing 106 and the threshold although the former varies the level of the threshold 112 while the latter varies the DC level of the signal for receipt processing 106. The illustrative embodiment shown in FIG. 5 therefore achieves the same advantages as the embodiment shown in FIG. 1.

The illustrative embodiment shares the same concept with the embodiment shown in FIG. 1, but varies the DC level of the signal for receipt processing 106 instead of the level of the threshold, as stated above. Alternatively, on the basis of the concept of the embodiment shown in FIG. 3, the illustrative embodiment may be adapted to estimate the waveform distortion of a signal and vary the DC level of the signal for receipt processing 106 instead of the level of the threshold, if desired.

The adjustment coefficient a included in the Equation (1) of the embodiment described with reference to FIG. 1 is dealt with as a constant. If desired, the adjustment constant a may be varied in accordance with, e.g. the bit error rate of data 114 output from the comparison and reproduction unit 14.

While the illustrative embodiments have been shown and described as being applied to an optical signal receiver, the present invention is similarly applicable to a receiver of the kind receiving an electric or an electro-magnetic signal. For example, the present invention is applicable to setting a threshold for determining the code of a baseband signal, into which a bilevel FSK (Frequency Shift Keying) or similar digital signal is modulated.

In summary, it will be seen that the present invention provides threshold setting apparatus capable of automatically, relatively setting an identification threshold with a low-speed and simple circuit arrangement.

The entire disclosure of Japanese patent application No. 2002-168156 filed on Jun. 10, 2002, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. Apparatus for controlling a relative relation in DC level between a baseband signal produced by processing a received signal and a threshold for use in identifying data from the baseband signal, comprising:
   a waveform distortion estimating circuit for estimating, based on the baseband signal, a relation between a center of a dynamic range of the baseband signal and a crossing point at which a positive-going edge curve crosses a negative-going edge curve of an eye pattern formed by the baseband signal to produce estimated information; and
   a setting circuit for adjustably setting either one of the threshold and a DC level of the baseband signal in dependence upon the estimated information.

2. The apparatus in accordance with claim 1, wherein said waveform distortion estimating circuit comprises:
   a peak detector for detecting a maximum level of the baseband signal;
   a DC level detector for detecting a mean level of the baseband signal; and
   a bottom detector for detecting a minimum level of the baseband signal;
   said waveform distortion estimating circuit providing said setting circuit with the estimated information including the maximum level, the mean level and the minimum level detected.

3. The apparatus in accordance with claim 2, wherein the threshold is a fixed value, said apparatus further comprising a DC level shifter operative in response to the estimated information for shifting the DC level of the baseband signal from which the data are to be identified.

4. The apparatus in accordance with claim 1, wherein said waveform distortion estimating circuit comprises:
   a high-frequency separator for separating a high-frequency signal whose frequency is coincident with a bit rate of the baseband signal; and
   a phase difference and amplitude detecting circuit for detecting a phase difference of the high-frequency signal from a timing clock defining a timing for identifying and reproducing the baseband signal, and an amplitude of the high-frequency signal;
   said waveform distortion estimating circuit providing said setting circuit with the estimated information including information representative of a relational combination of the detected phase difference and the detected amplitude.

5. The apparatus in accordance with claim 1, wherein the baseband signal is an electric signal to which an intensity-modulated optical signal is converted.

6. Apparatus for identifying and reproducing serial data carried on a baseband signal with respect to a threshold, comprising:
   a waveform distortion estimating circuit for estimating, based on the baseband signal, a relation between a center of a dynamic range of the baseband signal and a crossing point at which a positive-going edge curve crosses a negative-going edge curve of an eye pattern formed by the baseband signal to produce estimated information;
   a reproducing circuit for identifying the serial data with respect to a relative relation in DC level between the baseband signal and the threshold to reproduce the identified serial data; and
   a setting circuit for adjustably setting the threshold in dependence upon the estimated information to said reproducing circuit.

7. The apparatus in accordance with claim 6, wherein said waveform distortion estimating circuit comprises:
   a peak detector for detecting a maximum level of the baseband signal;
   a DC level detector for detecting a mean level of the baseband signal; and
   a bottom detector for detecting a minimum level of the baseband signal;
   said waveform distortion estimating circuit providing said setting circuit with the estimated information including the maximum level, the mean level and the minimum level detected.

8. The apparatus in accordance with claim 6, wherein said waveform distortion estimating circuit comprises:
   a high-frequency separator for separating a high-frequency signal whose frequency is coincident with a bit rate of the baseband signal;
   a clock separator for separating a timing clock from the baseband signal; and
   a phase difference and amplitude detecting circuit for detecting a phase difference of the high-frequency signal from the timing clock, and an amplitude of the high-frequency signal;
   said waveform distortion estimating circuit providing said setting circuit with the estimated information including information representative of a relational combination of the detected phase difference and the detected amplitude.

9. The apparatus in accordance with claim 8, wherein said high-frequency separator comprises a band-pass filter for preventing frequency components other than the high-frequency signal from being passed to said phase difference and amplitude detecting circuit.

10. The apparatus in accordance with claim 6, further comprising an optical-to-electrical converter for receiving an intensity-modulated optical signal to the baseband signal to provide said waveform distortion estimating circuit with the baseband signal.

11. Apparatus for identifying and reproducing serial data carried on a baseband signal with respect to a threshold, comprising:
   a waveform distortion estimating circuit for estimating, based on the baseband signal, a relation between a center of a dynamic range of the baseband signal and a crossing point at which a positive-going edge curve crosses a negative-going edge curve of an eye pattern formed by the baseband signal to produce estimated information;
   a reproducing circuit for identifying the serial data with respect to a relative relation in DC level between the baseband signal and the threshold to reproduce the identified serial data; and
   a setting circuit for adjustably setting a DC level of the baseband signal in dependence upon the estimated information to said reproducing circuit.

12. The apparatus in accordance with claim 11, wherein said waveform distortion estimating circuit comprises:
- a peak detector for detecting a maximum level of the baseband signal;
- a DC level detector for detecting a mean level of the baseband signal; and
- a bottom detector for detecting a minimum level of the baseband signal;

said waveform distortion estimating circuit providing said setting circuit with the estimated information including the maximum level, the mean level and the minimum level detected.

13. The apparatus in accordance with claim 11, wherein said waveform distortion estimating circuit comprises:
- a high-frequency separator for separating a high-frequency signal whose frequency is coincident with a bit rate of the baseband signal;
- a clock separator for separating a timing clock from the baseband signal; and
- a phase difference and amplitude detecting circuit for detecting a phase difference of the high-frequency signal from the timing clock, and an amplitude of the high-frequency signal;

said waveform distortion estimating circuit providing said setting circuit with the estimated information including information representative of a relational combination of the detected phase difference and the detected amplitude.

14. The apparatus in accordance with claim 13, wherein said high-frequency separator comprises a band-pass filter for preventing frequency components other than the high-frequency signal from being passed to said phase difference and amplitude detecting circuit.

15. The apparatus in accordance with claim 11, wherein the threshold is supplied to said reproducing circuit as a fixed value, said apparatus further comprising a DC level shifter for providing said reproducing circuit with the baseband signal with the DC level of the baseband signal shifted in dependence upon the estimated information.

16. The apparatus in accordance with claim 11, further comprising an optical-to-electrical converter for receiving an intensity-modulated optical signal to the baseband signal to provide said waveform distortion estimating circuit with the baseband signal.

* * * * *